United States Patent [19]

Odawara et al.

[11] Patent Number: 4,866,693
[45] Date of Patent: Sep. 12, 1989

[54] INFORMATION PROCESSING APPARATUS

[75] Inventors: Kazuhara Odawara, Yokohama; Hidesato Kashiwagi, Kawasaki, both of Japan

[73] Assignee: Kabushiki Kaisha Toshiba, Kanagawa, Japan

[21] Appl. No.: 56,899

[22] Filed: Jun. 3, 1987

[30] Foreign Application Priority Data

Jun. 13, 1986 [JP] Japan ................................ 61-137487

[51] Int. Cl.⁴ ...................... B65D 85/02; G11B 23/02
[52] U.S. Cl. ................................ 369/75.2; 360/99.03; 360/99.07; 369/77.2
[58] Field of Search ..................... 369/75.2, 77.2, 270, 369/271, 292; 360/99.02, 99.03, 99.05, 99.06, 99.07, 99.12

[56] References Cited

U.S. PATENT DOCUMENTS

| | | | |
|---|---|---|---|
| 4,351,047 | 9/1982 | Redlich et al. | 369/270 |
| 4,367,547 | 1/1983 | Thigpen | 369/271 |
| 4,368,495 | 1/1983 | Hamanaka et al. | 360/97 |
| 4,510,591 | 4/1985 | Schatteman | 369/77.1 |
| 4,570,194 | 2/1986 | Schatteman | 369/270 |
| 4,672,598 | 6/1987 | Koken et al. | 369/75.2 |
| 4,680,748 | 7/1987 | Kodayashi | 369/271 |
| 4,707,821 | 11/1987 | Verhagen | 369/292 |

FOREIGN PATENT DOCUMENTS

| | | |
|---|---|---|
| 59-198560 | 11/1984 | Japan . |
| 60-93678 | 5/1985 | Japan . |
| 60-191465 | 9/1985 | Japan . |
| 61-115281 | 6/1986 | Japan . |
| 61-115282 | 6/1986 | Japan . |

Primary Examiner—Steven L. Stephan
Attorney, Agent, or Firm—Finnegan, Henderson, Farabow, Garrett, & Dunner

[57] ABSTRACT

An optical disc information processing apparatus includes a turntable and magnetic member for attracting the disc onto the turntable. The apparatus includes a main body having a port therein for receiving and discharging the disc therethrough; and moving mechanism for moving the disc from the turntable to the port, including tilting mechanism for inclining the disc with respect to the turntable for reducing the counteracting force required to overcome the attracting force of the magnetic member during movement of the disc from the turntable to the port.

2 Claims, 12 Drawing Sheets

INFORMATION PROCESSING APPARATUS

BACKGROUND OF THE INVENTION

1. Field of the Invention

The present invention relates to an information processing apparatus in which a data recording disc, such as an optical disc, is accommodated. Particularly, it relates to a mechanism for unloading a disc loaded on a turntable.

2. Description of the Related Art

Optical disc apparatus which employ an optical disc as a data storage medium have made possible a large increase in storage capacity compared with previously used magnetic disc loading apparatus. The optical disc apparatus can reproduce data in a stable manner with minimal noise. Further, in such an apparatus, extremely stable reproducing conditions are obtained, which are substantially unaffected by external influences. Moreover, since the data processing is performed without physical contact between a recording/reproducing head and the surface of the optical disc, damage of the optical head and the optical disc are minimized. Therefore, the use of such optical disc apparatus has increased greatly.

In a conventional cartridge loading apparatus, as shown in U.S. Pat. No. 4,439,850 (Takahara et al), in order to hold the disc accommodated in the cartridge on a turntable, it is pressed against the turntable from the opposite side thereof, by means of a clamper. The clamper receives a clamping force from urging means by magnetic attraction produced between the clamper and turntable. In this construction, the clamper is formed of magnetic material, and the turntable has a magnet therein. The conventional apparatus requires a space for accommodating the clamper. Further, a drive mechanism is necessary for moving the clamper toward or away from the optical disc. As a result, the apparatus is bulky and complicated to construct and inevitably is larger, heavier and more expensive to produce. Also, the use of the clamp mechanism makes it difficult to assemble the apparatus and to maintain it in proper alignment.

An invention of the same assignee is disclosed in a related U.S. application, Ser. No. 004,097 filed Jan. 16, 1987, which disclosure is hereby incorporated by reference herein. It is believed that this disclosure does not constitute prior art with respect to the present invention. This related application describes an information processing apparatus including an optical disc and a drive mechanism for rotating the disc. The disc comprises a disc-shaped body with an attractable portion at the central portion of the body. The attractable portion has an attractable member projecting from the body. A center hole, defining the center of rotation of the body, is cut in the attractable member. The drive mechanism includes a turntable which is rotated by a motor. A depression is formed in a support surface of the turntable. A magnetic attraction unit is arranged in the depression so as to magnetically attract the attractable portion, whereby the attractable member is housed in the depression and the surface of the body is contact with the support surface. Thus, the disc can be mounted stably on the turntable, irrespective of the thickness of the disc, and without the need for clamp mechanism, which has conventionally been used. Such clamp mechanisms have prevented reduction in size, weight, and costs of manufacturing the apparatus.

In an apparatus of this type, where the disc is held by magnetic attraction, the mounted condition of the disc maybe released by directly lifting the disc in the perpendicular direction. However, when the mounted condition is released in this way, since the surface of the disc and the support surface of the turntable are always parallel, a large force is required to counter act the magnetic attraction and release this mounted condition of the disc. This means that a larger motor maybe required for the apparatus, or greater power must be needed to overcome the magnetic force.

SUMMARY OF THE INVENTION

It is an object of the present invention to provide an information processing apparatus which is of a simple construction, but in which the force required to release the mounted condition of a data recording disc can be substantially reduced.

According to one aspect of the present invention, there is provided an optical disc information processing apparatus, including a turntable, and magnetic means for attracting the disc onto the turntable, the apparatus comprising a main body having a port therein for receiving and discharging the disc therethrough; and means for moving the disc from the turntable to the port, including slot means for inclining the disc with respect to the turntable for reducing the counteracting force required to overcome the attracting force of the magnetic means during movement of the disc from the turntable to the port.

Preferably, the moving means includes means for holding the disc during the movement of the disc between the port and the turntable.

Further, the slot means includes a pair of cam slots for interacting with the holding means to tilt the holding means with respect to the turntable.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawing of which:

FIG. 18 is a partial sectional view showing another embodiment of a disc cartridge used for an information processing apparatus according to the present invention.

DETAILED DESCRIPTION OF THE PREFERRED EMBODIMENT

One of the preferred embodiments of the present invention will be described with reference to the accompanying drawings.

In the present invention, the information processing apparatus comprises a main body having a port for receiving and discharging the recording disc therethrough, a moving mechanism for moving the recording disc which is magnetic attractive held on a turntable to the port, the moving mechanism included tilting mechanism for tilting the disc attracted with the turntable to separate from the surface of turntable.

Figure 1:
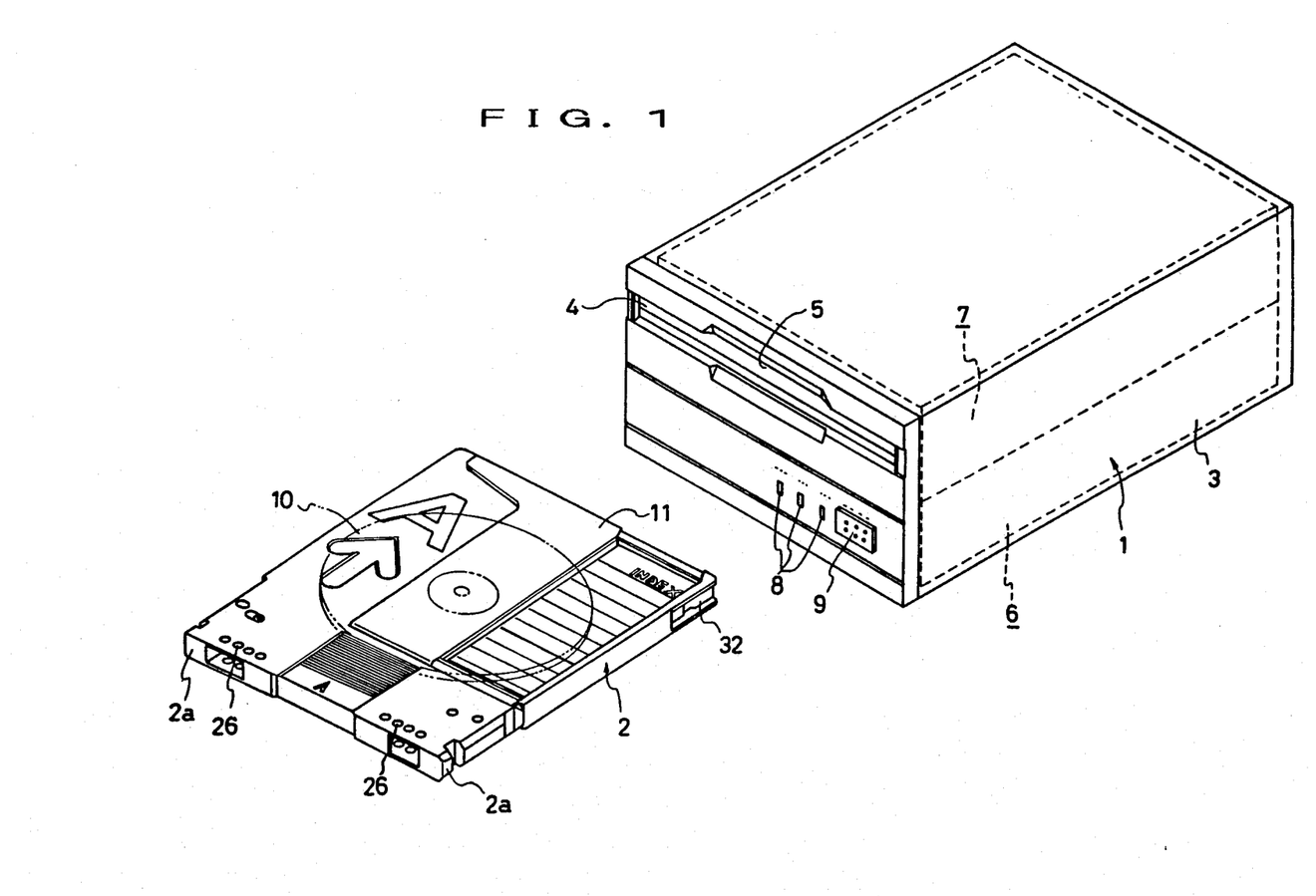
FIG. 1 is an exterior perspective view showing a cartridge loading apparatus constituting an optical disc apparatus, and a disc cartridge according to the present invention.

FIG. 1 shows an exterior view of a cartridge loading apparatus 1 for a optical disc apparatus and a disc cartridge 2 for use with this apparatus. The construction of optical disc apparatus 1 is as follows. At the front surface of a main body 3, a port 5 is formed and a shutter 4 is mounted to open and close port 5 for the insertion/removal of disc cartridge 2. Inside main body 3 are housed a drive base mechanism 6, a loading mechanism 7, and a control circuit (not shown). A state indicator 8 and a cartridge eject switch 9 are disposed at the bottom right of the front of body 3. State indicater 8 indicates an apparatus operation state, a ready state of a cartridge inserted state. Cartridge eject switch 9 is pressed by an operator when disc cartridge 2 is ejected from main body 3 through port 5.

Disc cartridge 2 (referred to below simply as "cartridge") has incorporated within it a optical disc 10 (referred to below simply as "disc"). Disc 10 has an outer diameter of about 130 mm with both sides A and B. At each surface of sides A and B, a data recording layer is formed to record and reproduce data with a laser beam or the like. It is also provided with a sliding shutter 11 for opening a window 135 (see FIG. 17) which exposes a part of disc 10.

Figure 2:
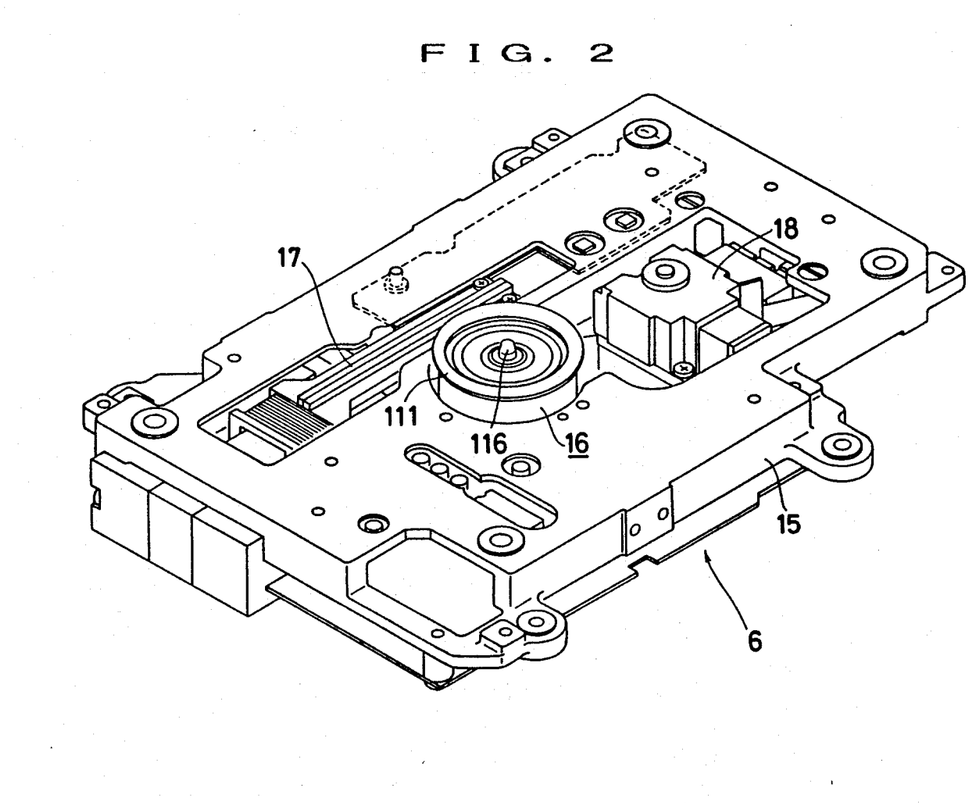
FIG. 2 is a perspective view showing a drive base mechanism which is a component part of the apparatus.

Drive base mechanism 6 is constructed as shown in FIG. 2. On a disc base 15, a motor 16 (spindle motor) is mounted to hold disc 10 and drive it in the rotary direction. Also a linear motor 17 is mounted on disc base 15 to move a recording/reproducing head 18 (optical head) in the radial direction of disc 10 to process data to/from the data recording layer on the underside of disc 10.

Figure 3:
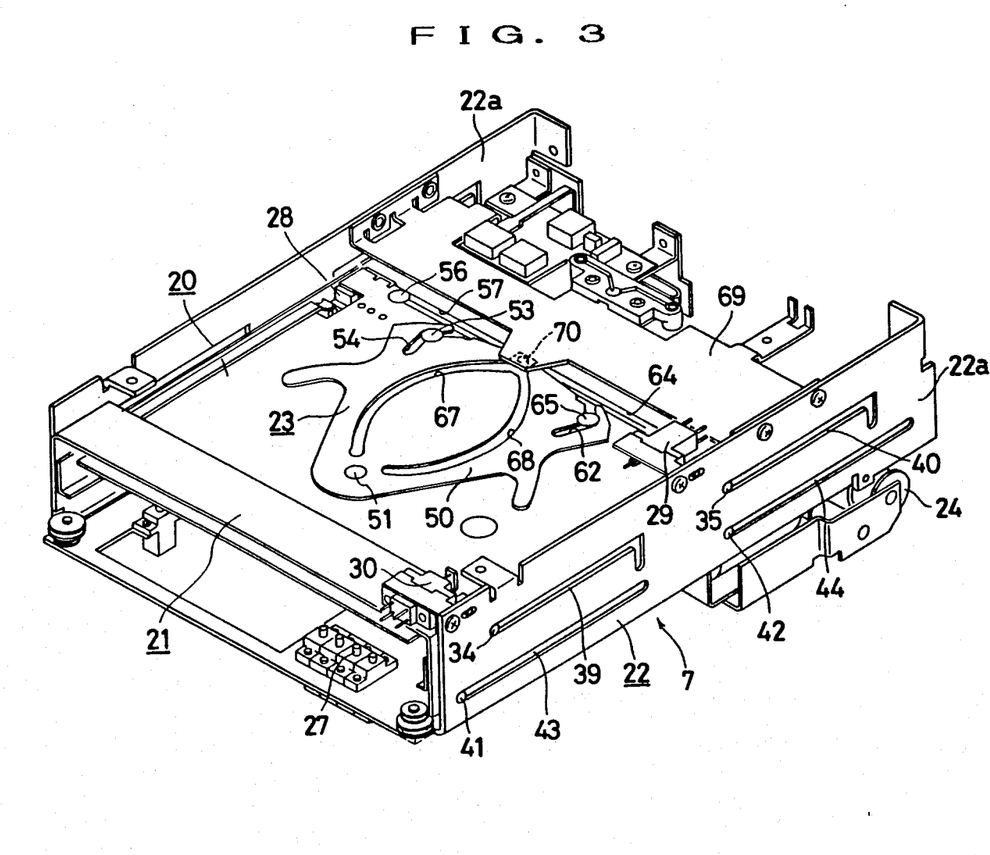
FIG. 3 is a perspective view of a loading mechanism which is a component part of the apparatus.
Figure 4:
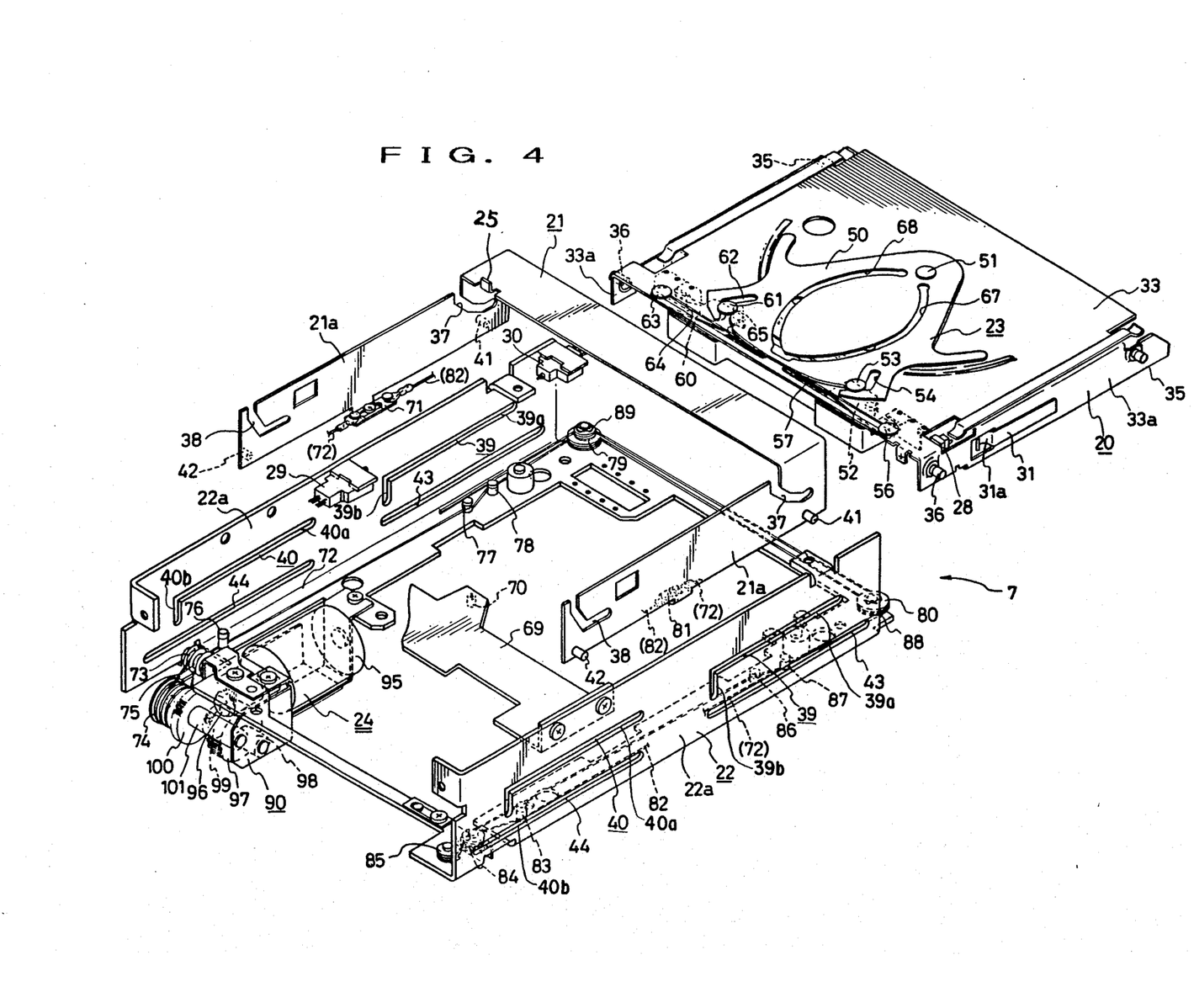
FIG. 4 is an exploded perspective view showing the loading mechanism.

Loading mechanism 7 is constructed such that it has, as shown in FIGS. 3 and 4, three component parts. These parts are a cartridge holder 20 (referred to below simply as "holder") for holding cartridge 2, a movable cam member 21 for taking this holder 20 and moving it to a prescribed position, and a guide member 22 which guides this cam member 21 and holder 20.

Holder 20 has incorporated in it a shutter moving means 23 for opening/closing shutter 11 of cartridge 2 to open or close window 135. At guide member 22, a cam member drive means 24 for driving cam member 21, an ID push-switch 27 for detecting ID holes 26 (see FIG. 1) of cartridge 2, an insertion stop switch 29 for controlling a motor when a cartridge is inserted, and an ejection stop switch 30 for controlling a motor when a cartridge is ejected are mounted. Stop switches 29 and 30 are pushed by a projection 25 formed on cam member 21.

Stop elements 31, comprising leaf springs, are provided on the sides of holder 20. When cartridge 2 is inserted into holder 20, these snap elements 31 snap into snap recesses 32 formed on the sides of cartridge 2 (see FIG. 1), thus holding cartridge 2 in place. As this takes place, a switch 28 fixed to the end of snap element 31, detects that cartridge 2 has been correctly inserted into holder 20. Then cam drive means 24 begins to operate.

If cartridge 2 is inserted backwards, corners 2a of the rear end of cartridge 2 (see FIG. 1) collide with the rising parts 31a of snap elements 31, which stops further insertion. Also, since no pressure is exerted on switch 28, automatic intake, which is operated by means to be described later, does not take place, and backward insertion is reliably prevented.

Guide pins 35 and 36 are mounted on sides 33a of a base 33 of holder 20. These guide pins 35 and 36, after being fitted through a first and second cam slots 37 and 38 formed on sides 21a of cam member 21, fit into guide slots 39 and 40 formed on sides 22a of guide member 22. First and second cam slots 37 and 38 are inclined at different angles. Each guide slots 39 and 40 have horizontal portions 39a and 40a along a first direction, and vertical portions 39b and 40b along a second direction substantially perpendicular to the first direction.

Guide studs 41 and 42 are mounted on sides 21a of cam member 21. These guide studs 41 and 42 fit into guide slots 43 and 44 formed on sides 22a of guide member 22. Each guide slots 43 and 44 have only a horizontal portion along the first direction. Cam member 21 can thus move in the direction of insertion of cartridge 2.

Figure 5:
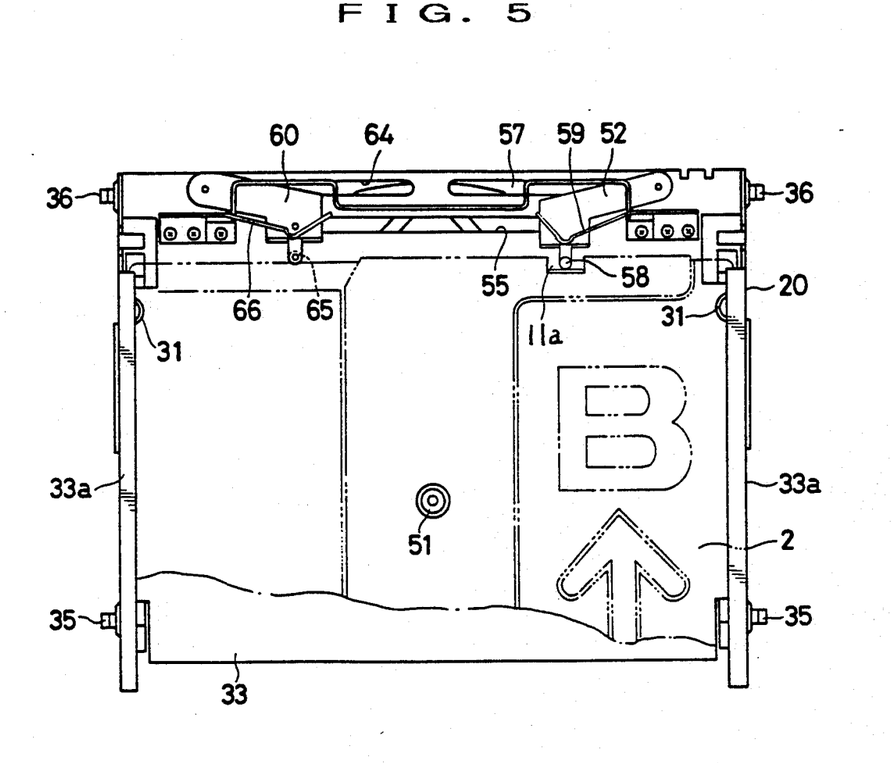
Fig. 5 is a bottom plan view showing the underside of a cartridge holder which is a component part of the loading mechanism.

An explanation will now be given, with additional reference to FIG. 5, of shutter opening/closing the means 23 mounted on base 33 of holder 20. A cam plate 50 for opening/closing the shutter is mounted on the upper surface of base 33, such that is can turn about a pin 51.

A shutter lever 52 for opening/closing shutter 11 of side A of cartridge 2, has a pin 53 for moving shutter lever 52, which engages with a slot 54 formed in cam plate 50 and a lever moving slot 55 formed in base 33. A pin 56 serving as a guide member to guide the moving of shutter lever 52, engages with a shutter opening/closing slot 57 formed in base 33. A shutter opening/closing pin 58 mounted on shutter lever 52 is biased towards cartridge 2 by means of a leaf spring 59 mounted on base 33. Shutter opening/closing pin 58 is positioned such that it engages with a locking window 11a formed in shutter 11 for locking shutter 11 when side A of cartridge 2 is being used.

Similarly, a shutter lever 60 for opening/closing shutter 11 of side B of cartridge 2, has a pin 61 for moving shutter lever 60, which engages with a slot 62 formed in cam plate 50 and lever moving slot 55 formed in base 33. A pin 63 serving as a guide member to guide the moving of shutter lever 60, engages with a shutter opening/closing slot 64 formed in base 33. A shutter opening/ closing pin 65 mounted on shutter lever 60, is biased towards cartridge 2 by means of a leaf spring 66 mounted on base 33. Shutter opening/closing pin 65 is positioned such that it engages with locking window 11a for locking shutter 11 when side B of cartridge 2 is being used.

A side A opening/closing slot 67 and a side B opening/closing slot 68 are formed symmetrically in cam plate 50 as guide slots. These slots 67 and 68 engage with a fixed pin 70 mounted on a fixed plate 69 which bridges guide member 22. Normally, fixed pin 70 is positioned at the neutral point where side A and side B opening/closing slots 67 and 68 meet. At the same time that side A of cartridge 2 is inserted into the correct position in holder 20, and snap recesses 32 engage with snap elements 31, shutter opening/closing pin 58 enters looking window 11a of shutter 11, and presses on the protruding part of an elastic locking lever (not shown) mounted on the front end of cartridge 2, releasing the lock of shutter 11.

Further, shutter opening/closing pin 65 is pressed to just the extent that shutter opening/closing pin 58 enters locking window 11a at the front of cartridge 2. The result of this is that since, when shutter lever 60 turns slightly about pin 63, pin 61 guides slot 62, cam plate 50 turns slightly about pin 51 to the shutter lever 60 side, and fixed pin 70 is guided from the neutral position to side A opening/closing slot 67. Thus far, all operations are performed automatically on the manual insertion of cartridge 2. The result is that when cam member drive means 24 operates, the whole of holder 20 moves.

An explanation will be given next of cam member drive means 24, referring to FIGS. 6 and 7.

Figures 6, 7:
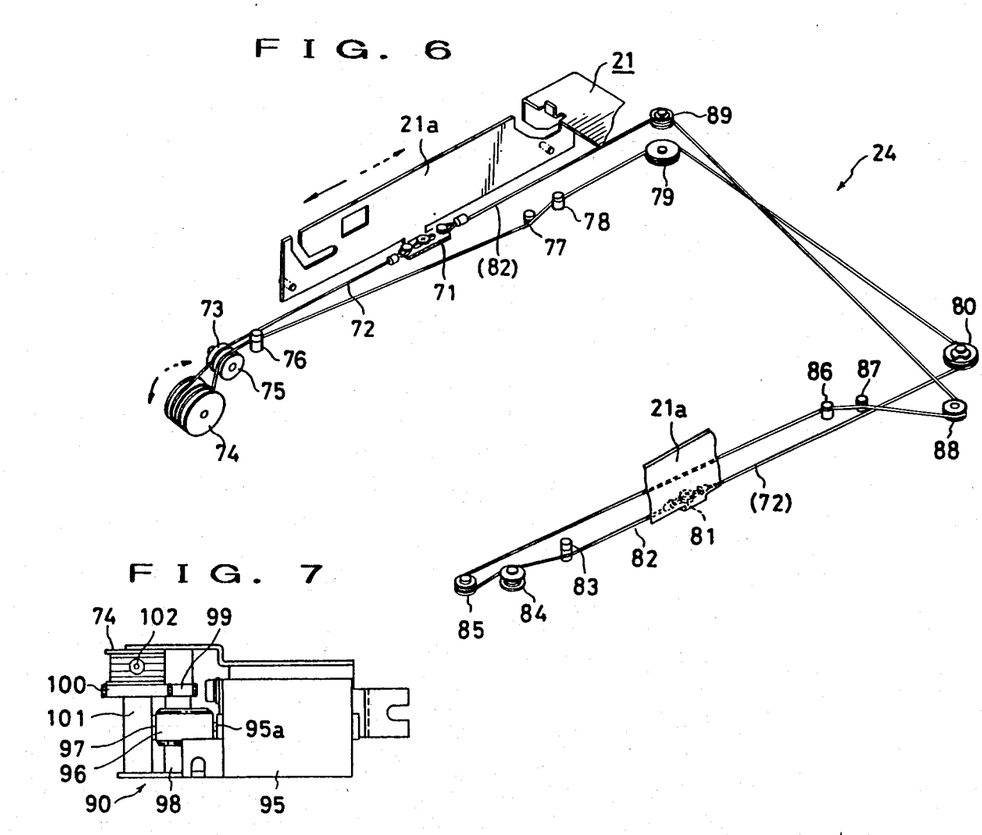
FIG. 6 is an explanatory view showing the construction of a cam member drive means which is a component part of the loading mechanism.
FIG. 7 is a plan view of the drive part of the cam member drive means.

Referring to FIG. 6, support of the wires 72 and 82 which constitute the means for moving cam member 21 will be explained. The hooked part at one end of wire 72 is secured to a wire-fastening part 71 on one side 21a of cam member 21, and the other end is extended, guided by a pulley 73. After this it is wound several times around a take-up pulley 74, which is driven by a drive means 90 to be described later. It is then taken by way of pulley 75, pin rollers 76, 77 and 78, and large-diameter rollers 79 and 80, to be secured to a wire-fastening part 81 on the other side 21a of cam member 21.

Similarly, one end of the other wire 82 is secured to wire-fastening part 81, and the wire is then taken by way of a pin roller 83, pulleys 84 and 85, pin rollers 86 and 87, and small-diameter rollers 80 and 89 which have the same axis as large-diameter rollers 80 and 79, to be secured to wire-fastening part 71 on the other side 21a of cam member 21. This combination of large-diameter pulleys 79 and 80 and small-diameter pulleys 89 and 88 permits wires 72 and 82 to cross each other without touching.

Tensioning pulleys (not shown) disposed along the path of wires 72 and 82 ensure that these wires 72 and 82 always have a constant tension.

Referring to FIGS. 4 and 7, and explanation will be given next of a drive means 90 which drives take-up pulley 74. A worm gear 96 is mounted on a reversible rotating shaft 95a of a drive motor 95. The mechanism has a worm wheel 97, which engages with this worm gear 96, and a spur gear 99, which is of integral construction with a shaft 98 of worm wheel 97. A spur gear 100 engages with spur gear 99. Take-up pulley 74 is mounted integrally with spur gear 100 and its shaft 101. A screw 102 is screwed into take-up pulley 74. Wire 72 wrapped around pulley 74 is held down and kept tightly in place by the head of screw 102. By this means wire is secured to take-up pulley 74, so that neither slips in relation to the other, and the rotation force of drive motor 95 is duly transmitted to movement of wire 72.

When take-up pulley 74 drives in the forward direction in FIG. 6 (direction of the solid line arrow), tension is applied to wire 72, and cam member 21 moves in the direction of the solid line. When take-up pulley 74 drives in the reverse direction (direction of the broken line arrow), tension is applied to wire 82, and cam member 21 moves in the direction of the broken line.

Figure 8:
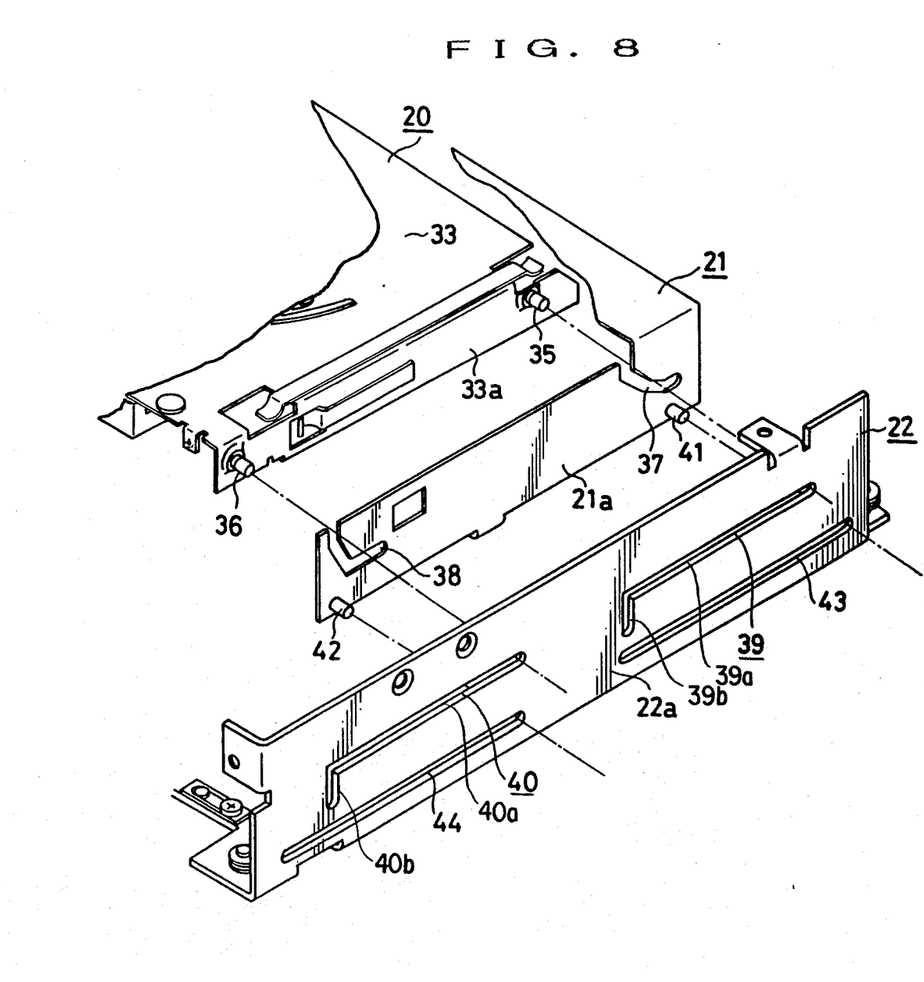
FIGS. 8 to 10 are explanatory views showing the relative positions of the loading mechanism as the cam member moves.
Figure 9:
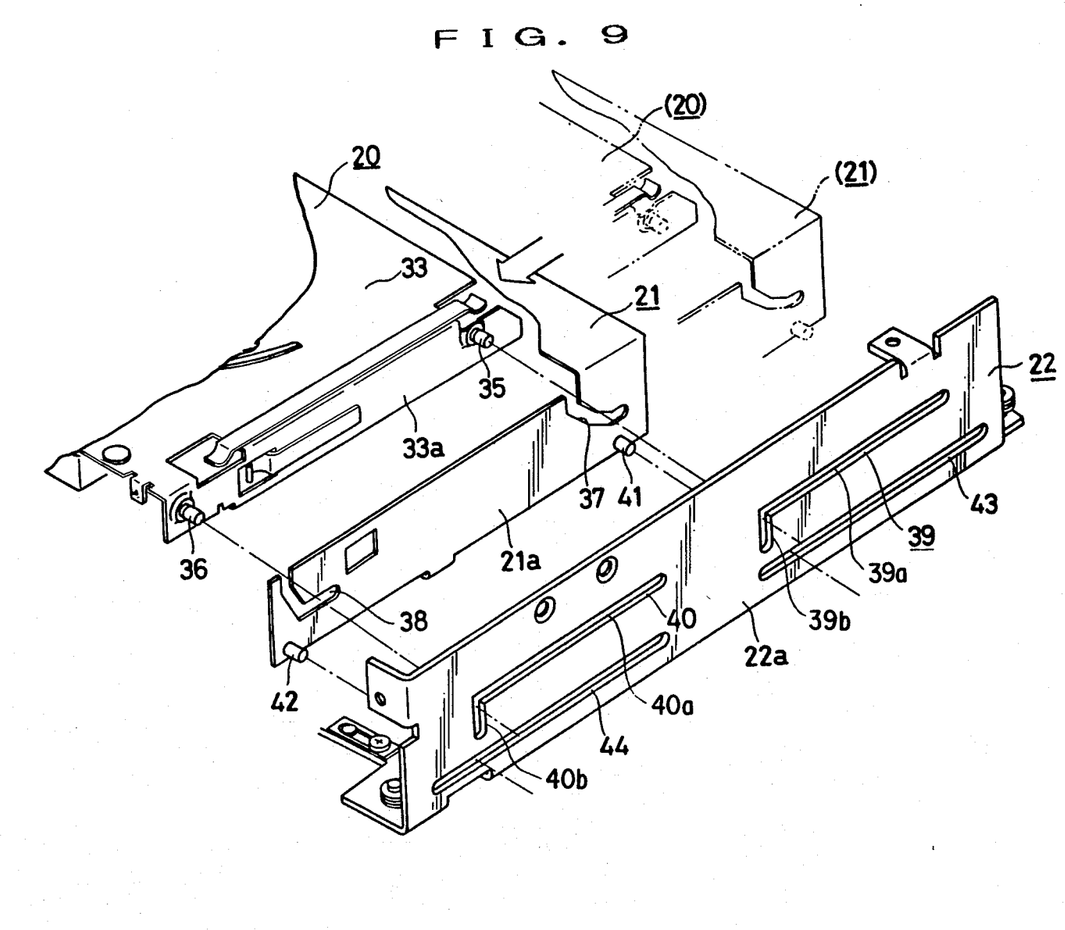
Figure 10:
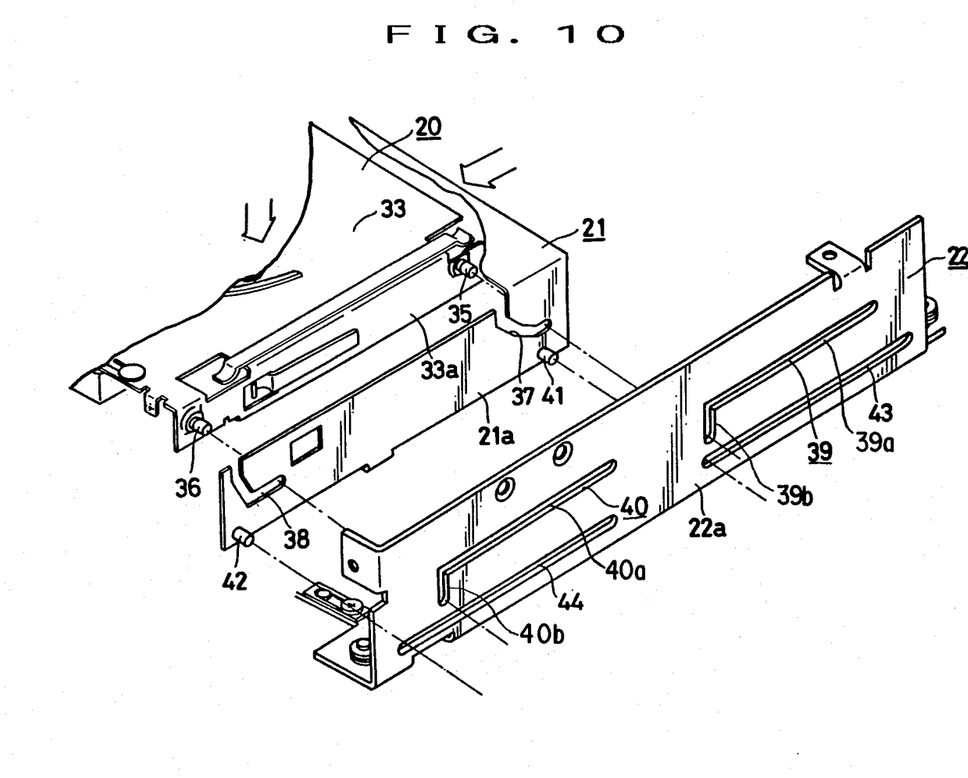

Referring to FIGS. 8–10, an explanation will be given next of the relative positions of holder 20, cam member 21 and guide member 22 when cam member 21 moves. First, FIG. 8 shows the positional state (with part of cartridge 2, which is held by holder 20, projecting from port 5) when cartridge 2 (see FIG. 1) is inserted into/-withdrawn from port 5. As it is inserted into port 5, cartridge 2 is housed in holder 20, which is in the state shown. When it is inserted up to the position where it activates switch 28, as described earlier, drive motor 95 applies drive force so as to rotate take-up pulley 74 in the forward direction. By this means, cam member 21 is made to move towards the inside of the apparatus (direction of the solid line arrow in FIG. 6).

When this takes place, cam member 21 moves in a horizontal direction, as guide studs 41 and 42 are guided by horizontal guide slots 43 and 44 of guide member 22. Holder 20 also moves in a horizontal direction, forming a single unit with cam member 21, as guide pins 35 and 36 are guided by horizontal portions 39a and 40a of guide slots 39 and 40.

When the position shown in FIG. 9 is reached, the horizontal movement of holder 20 is arrested, while cam member 21 continues to move. With this operation, guide pins 35 and 36, as a result of the functioning of cam slots 37 and 38 of cam member 21, begin to lower vertical portions 39b and 40b of guide slots 39 and 40, until the state shown in FIG. 10 is reached.

In the process of movement from FIG. 8 to FIG. 9, shutter 11 is opened by shutter opening/closing means 23, which is mounted on holder 20.

Figure 11:
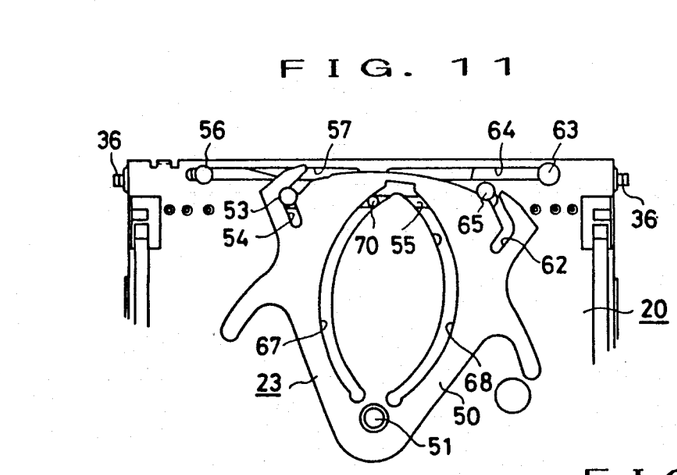
FIGS. 11 to 13 are explanatory views showing the operation of a shutter opening/closing means.
Figure 12:
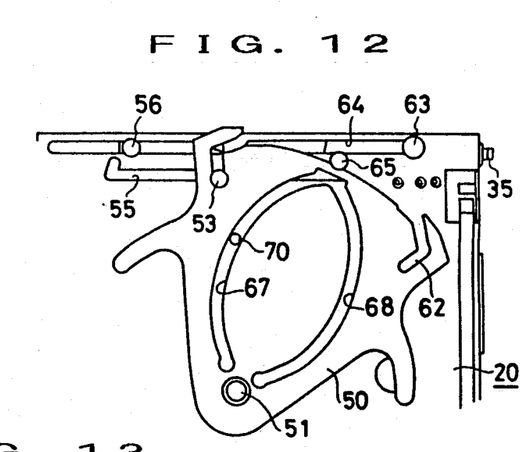
Figure 13:
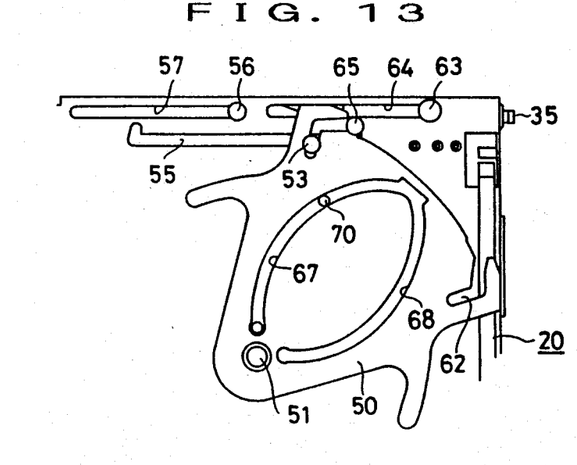

Referring to FIGS. 11–13, this operation will now be explained. When for example cartridge 2 is inserted up to the prescribed position in the holder 20 with side A uppermost, cam plate 50 turns about pin 51, changing its position somewhat, and engages at the point where fixed pin 70 has moved slightly from the neutral position of cam plate 50 to side A opening/closing sot 67, as shown in FIG. 11. In this state, pressure on switch 28 causes cam member 21 to start to move, and holder 20 to move with it, as already described above.

When holder 20 moves, since fixed pin 70 is in side A opening/closing slot 67, cam plate 50 is rotated gradually, as shown in FIGS. 12 and 13. As a result, pin 53 moves to the right, following lever moving slot 55. Upon movement of this pin 53, shutter lever 52 (see FIGS. 4 and 5) is caused to move to open shutter 11 by shutter opening/closing pin 58 engaging with locking window 11a formed in shutter 11. This engagement is maintained without change.

When holder 20, holding cartridge 2 with its shutter 11 already open, is lowered vertically from the state shown in FIG. 9 to that of FIG. 10, it is lowered, not in the horizontal state, but at a slight incline, owing to the difference in inclined angle between cam slots 37 and 38 formed on cam member 21. Finally, however, it is held in the horizontal position.

Figure 14:
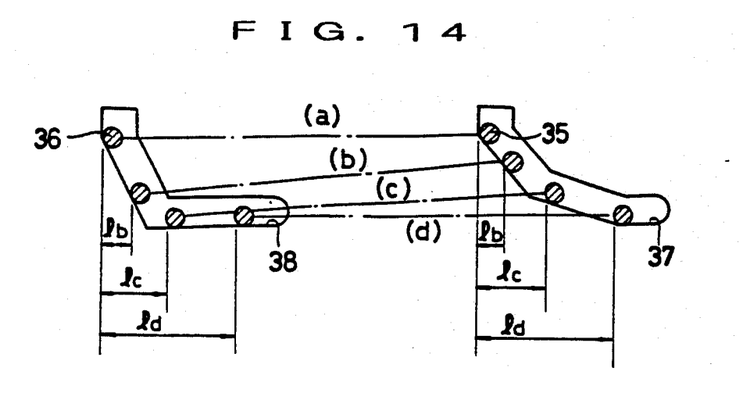
FIG. 14 is an explanatory view showing the positional relations of the cam slots and guide pins.

Referring to FIG. 14, this movement will now be explained. When cam member 21 moves by amounts lb, lc and ld, the difference in shape between cam slots 37 and 38 means that the amount by which pin 35 is lowered during this movement is somewhat less than that of pin 36.

For this reason, while line (a) of holder 20 (with cartridge 2 held within it) in FIG. 14 is horizontal, lines (b) and (c) are slightly inclined, and line (d) is horizontal again.

Figure 15:
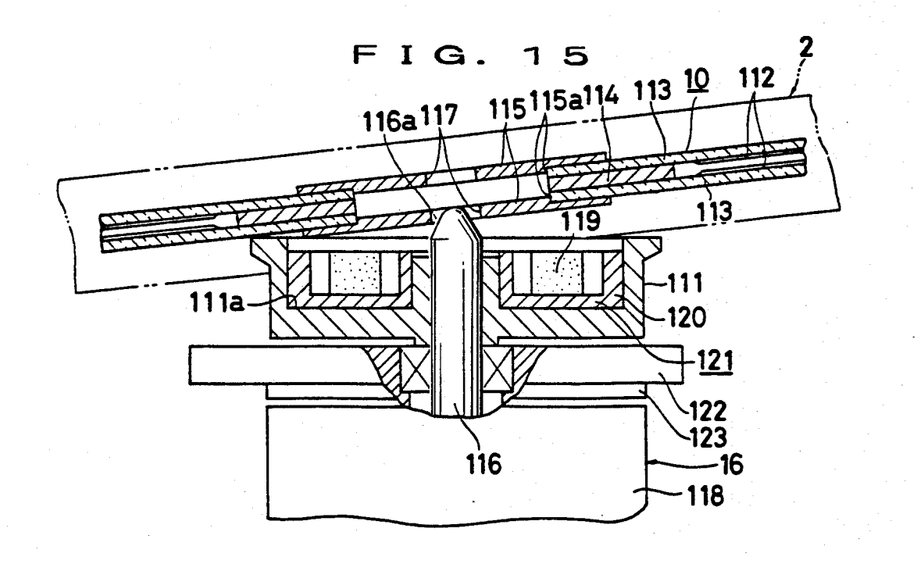
FIG. 15 is a partial sectional view showing the process involved when a disc cartridge is loaded on to or withdrawn from a turntable.

The line (c) state corresponds to the state shown in FIG. 15. In this state, a hub 115, functioning as an object of magnetic attraction, is separated from a turntable 111 of a motor 118 at a slight incline from the plane of this turntable 111. The line (d) state corresponds to the state shown in FIG. 16. In this state, hub 115 of disc 10 is now horizontal, and adheres closely to the surface of turntable 111 of motor 118. Turntable 111 houses within it a member 121 for forming a magnetic circuit including a magnet 119 and yoke 120, which attracts hub 115 of disc 10 to turntable 111.

Figure 16:
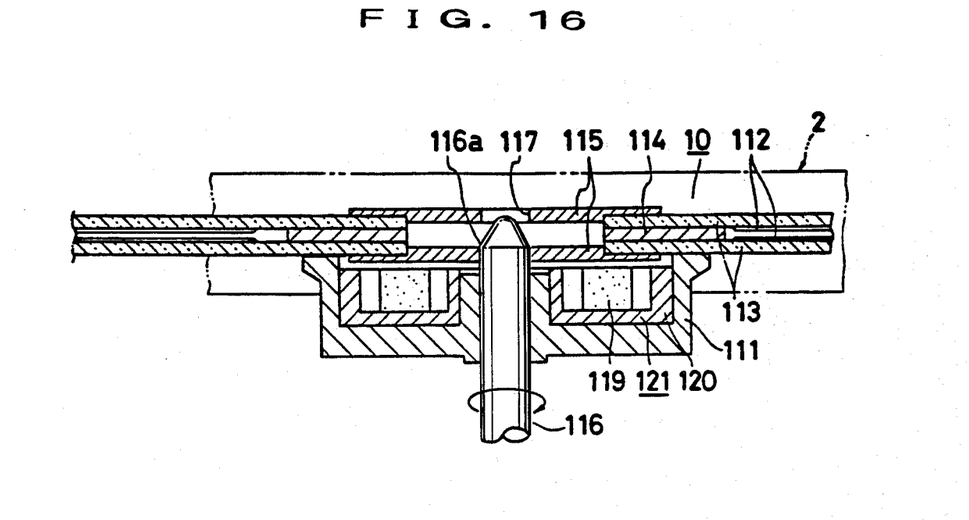
FIG. 16 is a partial sectional view showing the state when a disc cartridge has been loaded on to the turntable.

When disc 10 is removed from the state shown in FIG. 16, the attractive power of magnet 119 is cut off with minimum force by raising disc 10 at a slight angle, instead of lifting it straight from the horizontal. In addition to making for smooth operation and preventing vibration, etc., this enables the construction of the loading mechanism 6 to be kept simple. Above-mentioned cam slots 37 and 38 were designed to make this possible.

Holder 20 completes the function which is its purpose by loading disc 10 into disc motor 16 at the position shown in FIG. 10. When this takes place, insertion stop switch 29, activated by projection 25 (see FIG. 4) provided on cam member 21, stops motor 95 of cam member drive means 24.

Next, an explanation will be given of the movement of the ejection of a cartridge 2.

Motor 95 of cam member drive means 24 is make to rotate in reverse by a cartridge ejection signal, and cartridge 2 moves in the direction of port 5 (direction of the broken line arrow in FIG. 6) The opposite operation to that of insertion, which was explained by FIGS. 8-10, then takes place, with holder 20 rising from the position shown in FIG. 10 to that shown in FIG. 9. Disc 10 is removed from disc motor 16. When this takes place, since cam member 21 moves in the opposite direction to that in which it moves when cartridge 2 is inserted, the position of holder 20 moves in the line order (d)→(c)→(b)→(a), and is removed at an incline, as described earlier. After this, cam member 21 returns to the state in FIG. 8, with part of cartridge 2 projecting from port 5. In this state the movement of cam member 21 is stopped by pressing ejection stop switch 30 with projection 25 (see FIG. 4) provided on cam member 21 to stop the rotation of motor 90 of cam member drive means 24.

When this return operation takes place, shutter opening/closing means 23 mounted on cam member 21 operates, and the reverse operation to that of the opening of the shutter shown in FIGS. 11-13 is set in motion. This closes shutter 11 of cartridge 2, in addition to which shutter 11 is locked by the projecting part of the elastic locking lever (not shown) engaging with locking window 11a of shutter 11.

Cartridge 2 can be withdrawn by hand, since it has returned to the position at which it was inserted. When withdrawal has been completed, cam plate 50 of shutter opening/closing means 23 is returned to its original position by the force of leaf spring 66 energizing shutter lever 60, and fixed pin 70 reverts to the neutral position between side A opening/closing slot 67 and side B opening/closing slot 68, as shown in FIG. 3.

Disc 10 and disc motor 16, which holds disc 10 in place by magnetic attraction and causes it to rotate, are constructed as show in FIGS. 15 and 16. Disc 10 comprises a pair of disc-shaped substrates 113, and a ring-shaped inside spacer 114 and a ring-shaped outside spacer (not shown) sealed between the opposing surface of disc-shaped substrates 113 coaxially therewith Data recording layers 112 are formed on opposing surfaces of substrates 113, respectively. A hub 115 made of metal subject to magnetic attraction, is mounted on each outer surface of substrates 113, over its inner periphery.

Substrates 113 consist of transparent plastic plates formed by injection moulding, bonded together by an adhesive with ring-shaped inside spacer 114 and the ring-shaped outside spacer between.

Each hub 115 has a central hole 117 which fits over the centering part 116a of shaft 116 of disc motor 16. Further, each hub 115 has a projection part 115a formed on it, its position in relation to substrate 113 being fixed by fitting the outer rim of this projecting part 115a to the inner periphery of substrate 113.

Disc motor 16 has an outer-rotor type brushless DC motor 118, with its motor shaft serving as a rotary shaft 116 mentioned above, and a turntable 111 fixed to rotary shaft 116 of this motor 118. Turntable 111, which is formed of non-magnetic metal material, has a recessed part 111a formed on its upper side. Member 121 forming the magnetic circuit, including magnet 119 and yoke 120 which exert magnetic attraction on disc 10, is housed in this recessed part 111a. This emits sufficient force to retain disc 10 on turntable 111, and prevents magnetism from escaping outside.

In FIG. 15, disc motor 16 and a control circuit board 123, controlling the drive of motor 118, are mounted on a frame 122.

Which of the two sides, A and B has been inserted is detected by means of ID holes 26 and a write-protect hole provided in cartridge 2.

Figure 17:
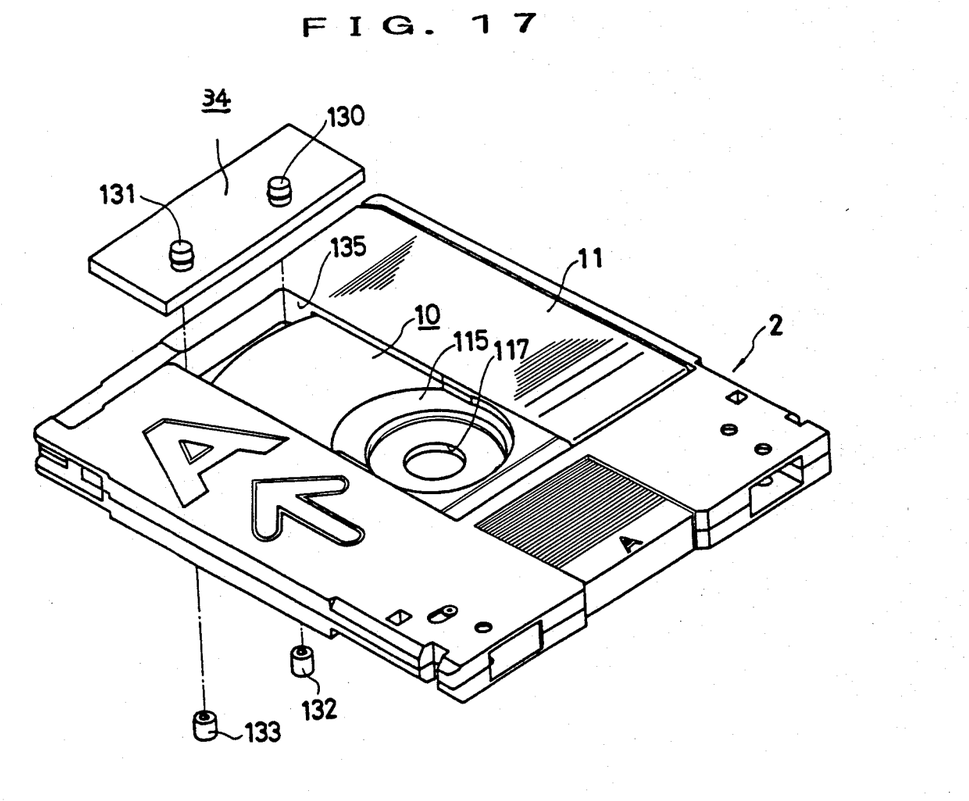
FIG. 17 is perspective view showing the state of detecting whether the shutter of a cartridge is opened or not opened.

A detecting means 34 detects whether shutter 11 of disc cartridge 2 is reliably open or closed. Detecting means 34 comprises a pair of light-emitting elements 130 and 131 arranged corresponding to corners of window 135 of disc cartridge 2, and a pair of light-detecting elements 132 and 133 arranged incorporated in drive base mechanism 6 opposite light-emitting elements 130 and 131, as shown in FIG. 17. When side A of disc cartridge 2 is uppermost, light from light-emitting element 130 passes through window 135 and is detected by light-detecting element 132. When side B of disc cartridge 2 is uppermost, light form light-emitting element 131 passes through window 135 and is detected by light-detecting element 133. In either case, shutter 11 can be ascertained to be completely open.

If shutter 11 is not completely open, in the case of side A, light form light-emitting element 130 is obstructed by shutter 11 and so does not reach light-detecting element 132. In the case of side B, light from light-emitting element 131 is obstructed by shutter and so does not reach light-detecting element 133. The shutter cannot therefore be ascertained to be completely open.

As described above, the present invention is a data processing apparatus wherein a disc cartridge accommodating a data recording disc therein is held by a cartridge holder and moved onto a turntable having a magnet. The data recording disc has a magnetic attraction member provided in its central portion so that it is held by magnetic attraction with the magnet of the turntable so the data recording disc can be rigidly held on the turntable while data processing is to be performed. When the mounted condition of the data recording disc held on the turntable is to be released, the data recording disc is separated by tilting with respect to the supporting surface of the turntable. The data processing apparatus can therefore be provided which is of a simple construction but in which the force required to release the mounted condition of the data recording disc can be greatly reduced, and in which automatic ejection can be achieved.

Various other modifications could be made in the invention without departing from the scope or spirit of the following claims.

What is claimed is:

1. An optical disc processing apparatus, comprising:
a disc cartridge having an optical disc mounted therein;
a chassis having a port for receiving and discharging said cartridge and optical disc therethrough;
means for rotating said optical disc, and magnet means for attracting said optical disc toward said rotating means;
a movable cartridge holder disposed within said chassis, for holding said cartridge when inserted through said port, said cartridge holder having a sidewall and at least two guide pins extending laterally from said sidewall;
a movable cam member for moving said holder to a predetermined position within said chassis, said cam member having a sidewall and at least two guide studs extending laterally therefrom, said sidewall of said cam member also having first and second cam slots configured therein for receiving respective ones of said at least two guide pins of said cartridge holder;
a guide member, disposed within said chassis, for guiding said cam member and said holder to and from said predetermined position, said guide member having a sidewall with first and second guide slots configured therein for receiving respective ones of said at least two guide pins of said cartridge holder, said at least two guide pins thereby being received in both said first and second cam slots and said first and second guide slots;
said sidewall of said guide member further having third and fourth guide slots configured therein for receiving respective ones of said at least two guide studs of said cam member;
said first and second guide slots of said guide member each having horizontal portions and vertical portions, and said third and fourth guide slots each having a horizontal portion configured with a predetermined length such that horizontal movement of said cam member guide studs relative said guide member sidewall is greater than horizontal movement of said cartridge holder guide pins relative said guide member sidewall; and
said cam member cam slots each having inclined portions for tilting said cartridge holder, said cartridge, and said optical disk relative said magnet means as said guide pins of said cartridge holder drop through said vertical portions of said first and second guide slots.

2. The apparatus of claim 1 wherein said horizontal portions of said first and second guide slots of said guide member are of substantially equal length, and said vertical portions of said first and second guide slots are of substantially equal length, and said predetermined length of said horizontal portions of said third and fourth guide slots is longer than said length of said horizontal portions of said first and second guide slots.

* * * * *